United States Patent
Bushnell

(10) Patent No.: US 6,718,784 B1
(45) Date of Patent: Apr. 13, 2004

(54) EVAPORATOR AIR SYSTEM FOR ROOFTOP BUS AIR CONDITIONER

(75) Inventor: Peter R. Bushnell, Cazenovia, NY (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 10/429,484

(22) Filed: May 5, 2003

(51) Int. Cl.[7] .............................................. B60H 1/32
(52) U.S. Cl. ....................................... 62/244; 62/259.1
(58) Field of Search ...................... 62/244, 239, 259.1, 62/DIG. 16

(56) References Cited

U.S. PATENT DOCUMENTS

| | | | | |
|---|---|---|---|---|
| 4,607,497 A | * | 8/1986 | Ferdows et al. ............... | 62/179 |
| 4,679,616 A | * | 7/1987 | Ferdows et al. ............... | 165/43 |
| 4,727,728 A | * | 3/1988 | Brown ......................... | 62/244 |
| 4,732,011 A | * | 3/1988 | Haiya ........................... | 62/244 |
| 5,005,372 A | * | 4/1991 | King ............................ | 62/244 |
| 5,184,474 A | * | 2/1993 | Ferdows ....................... | 62/244 |
| 5,605,055 A | * | 2/1997 | Salgado ........................ | 62/244 |
| 5,632,330 A | * | 5/1997 | Drucker et al. .............. | 165/151 |
| 6,282,912 B1 | * | 9/2001 | Mannerheim ................. | 62/244 |
| 6,286,328 B1 | * | 9/2001 | Kawahara ..................... | 62/285 |
| 6,295,826 B1 | * | 10/2001 | Lee ............................... | 62/244 |
| 6,470,699 B1 | * | 10/2002 | Okuda et al. .............. | 62/259.2 |
| 6,536,222 B1 | * | 3/2003 | Ahn et al. .................... | 62/244 |

FOREIGN PATENT DOCUMENTS

| DE | EP000827855 A2 | * | 3/1998 |
|---|---|---|---|
| EP | GB 2033073 A | * | 5/1980 |

* cited by examiner

Primary Examiner—William E. Tapolcai
Assistant Examiner—Mohammad M. Ali
(74) Attorney, Agent, or Firm—Wall Marjama & Bilinski LLP

(57) ABSTRACT

An air conditioning module is constructed to include all the necessary components for an air conditioning system within a single housing, with the housing having a supply air opening and a return air opening. The various components within the housing are so situated that the return air opening is relatively large in its lateral extension across the roof of a bus such that a single module can accommodate various configurations and locations of the supply air and return air openings in the roof of a bus.

16 Claims, 7 Drawing Sheets

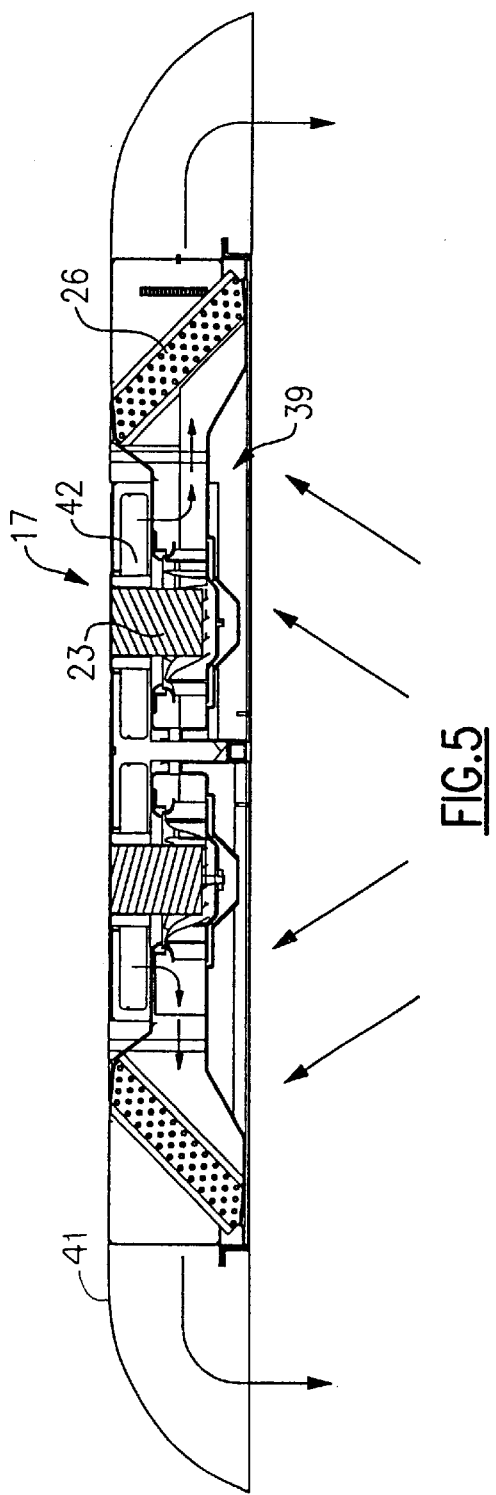
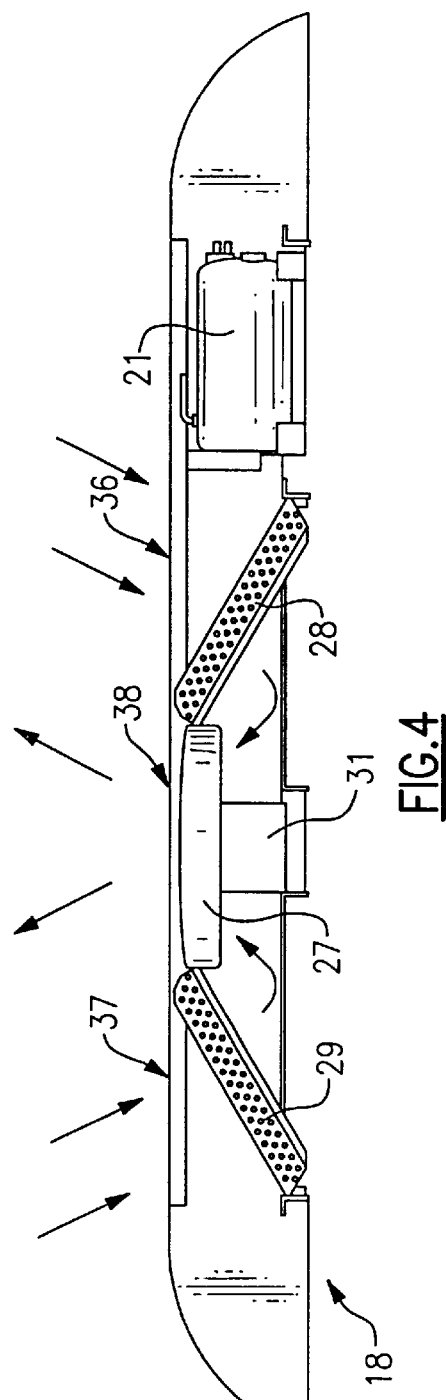

EVAPORATOR AIR SYSTEM FOR ROOFTOP BUS AIR CONDITIONER

CROSS REFERENCE TO RELATED APPLICATIONS

This application is related to the following pending applications being concurrently filed herewith and assigned to the assignee of the present invention:

| Title | Our Docket No.: |
| --- | --- |
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

BACKGROUND OF THE INVENTION

This invention relates generally to air conditioning systems and, more particularly, to an air conditioning system for the rooftop of a bus.

The most common approach for air conditioning a bus is to locate the air conditioning components on the rooftop thereof. Inasmuch as power is available from the engine that drives the bus, it has become common practice to locate the air conditioning compressor near the drive engine such that the drive engine is drivingly connected to the compressor, with the compressor then being fluidly interconnected to the air conditioning system on a rooftop of a bus. This, of course, requires rather extensive piping between the engine compartment and the air conditioning unit, thereby increasing installation and maintenance costs.

Another problem with such existing systems is that the speed that the compressor is driven is dependent on the speed in which the drive engine is running. Thus, when the drive engine is idling in a parking lot, for example, the compressor is running at a relatively slow speed which may not be sufficient to provide the desired degree of air conditioning. It is therefore generally necessary to oversize the compressor in order to obtain the performance needed under these conditions.

Others problems associated with such a motor driven compressor system is that the open drive compressor needs a shaft seal and a mechanical clutch, both of which are subject to maintenance problems. Further, since DC power is available on a bus, DC motors have been used for the air conditioning system. In general, DC motors are not as reliable as AC motors since they have brushes that wear out, and brushless motors are relatively expensive.

In addition to the problems discussed hereinabove, it is recognized, that because the wide variety of bus types and application requirements, it has been necessary to provide many different types and variations of air conditioning systems in order to meet these different requirements and vehicle interfaces. As a result, the manufacturing and installation costs, and sustaining engineering resources that are necessary in order to properly maintain and service these units, are relatively high.

Traditionally, the condenser coils and fans have been located near the centerline of the bus rooftop, whereas the evaporator coils and fans are closer to the lateral sides of the rooftop. Further, the evaporator fans are of the draw-through type wherein the evaporator fans are placed downstream of the coils and act to draw the conditioned air from the coils. This provides a uniform velocity distribution at the coil but leads to undesirable high jet flow leaving the fan and subsequently pushing into the bus ducting system. Also, because of the need to have the fan outboard of the coil, it has been necessary to place the coil more toward the center of the bus than might be otherwise desired.

It is therefore an object of the present invention to provide an improved bus rooftop air conditioning system.

Another object of the present invention is the provision for a bus air conditioning system which is effective at all engine operating speeds of the bus, while at the same time does not require an oversized compressor.

Yet another object of the present invention is the provision for reducing the manufacturing, installation, and maintenance costs of a bus air conditioning system.

Still another object of the present invention is the provision in an evaporator section of a bus rooftop air conditioning system for locating the evaporator coil more toward the lateral edges of the bus.

Yet another object of the present invention is the provision for a bus rooftop air conditioning system which is economical to manufacture and effective in use.

These objects and other features and advantages become more readily apparent upon reference to the following descriptions when taken in conjunction with the appended drawings.

SUMMARY OF THE INVENTION

Briefly, in accordance with one aspect of the invention, an air conditioning module is assembled with its condenser coil, evaporator coil and respective blowers located within the module and so situated that a standard module can accommodate various installation interfaces with different types and locations of return air and supply air ducts on a bus.

In accordance with another aspect of the invention, each of a plurality of modules are installed in a centered relationship with respect to a longitudinal centerline of the bus and extend transversely across the width of the bus. The number and length of modules is dependent of the total air conditioning capacity requirement of the bus.

By yet another aspect of the invention, each of the modules include all the necessary components with electrical power being provided to the electrical components by an inverter/controller that is powered by an engine driven generator.

By another aspect of the invention, the evaporator blower is placed inboard of the evaporator coils and acts to blow air from the return air duct through the coils to be cooled.

By still another aspect of the invention the evaporator section of the module has a return air plenum that spans a substantial width of the bus to thereby accommodate various sizes and types of return air interface requirements.

By yet another aspect of the invention the evaporator section of each module has two different vertical levels to accommodate the respective incoming flows of return air and replenishing fresh air, and includes a mixer for selectively varying the amount of each which passes to the fan and then to the evaporator coil.

In the drawings as hereinafter described, a preferred embodiment is depicted; however various other modifications and alternate constructions can be made thereto without departing from the true sprit and scope of the invention.

BRIEF DESCRIPTION OF THE DRAWINGS

FIG. 4 is a front elevational view of the condenser section of the module.

FIG. 5 is a front elevational view one embodiment of the evaporator section of the module.

DESCRIPTION OF THE PREFERRED EMBODIMENT

Figure 1:
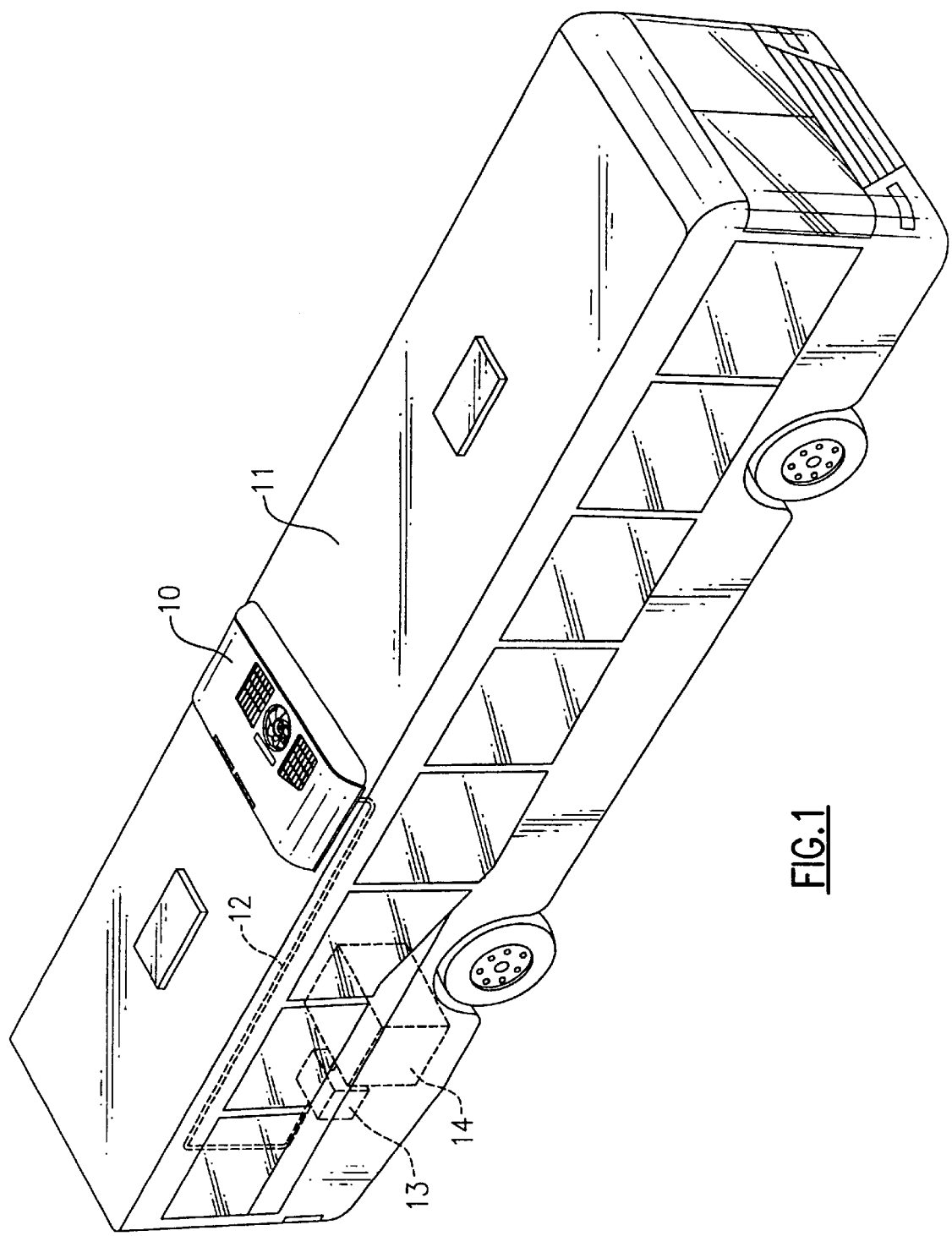
FIG. 1 is a perspective view of a module as installed on the rooftop of a bus in accordance with a preferred embodiment of the invention.

The inventive module is shown generally at 10 in FIG. 1 as applied to the rooftop 11 of a bus in accordance with the present invention. Electrical power is provided to the module 10 by way of line 12, which in turn receives its power from a generator 13 driven by the bus engine 14 as shown.

The module 10 interfaces with openings in the bus top so that fans within the module 10 cause the return air from the passenger compartment to flow upward into the module 10 where it is conditioned, and the conditioned air to then flow downwardly into supply air ducts that carry the conditioned air to the passenger compartment. The various structures and the manner in which they interface with the bus rooftop 11 will more fully described hereinafter.

Figure 2:
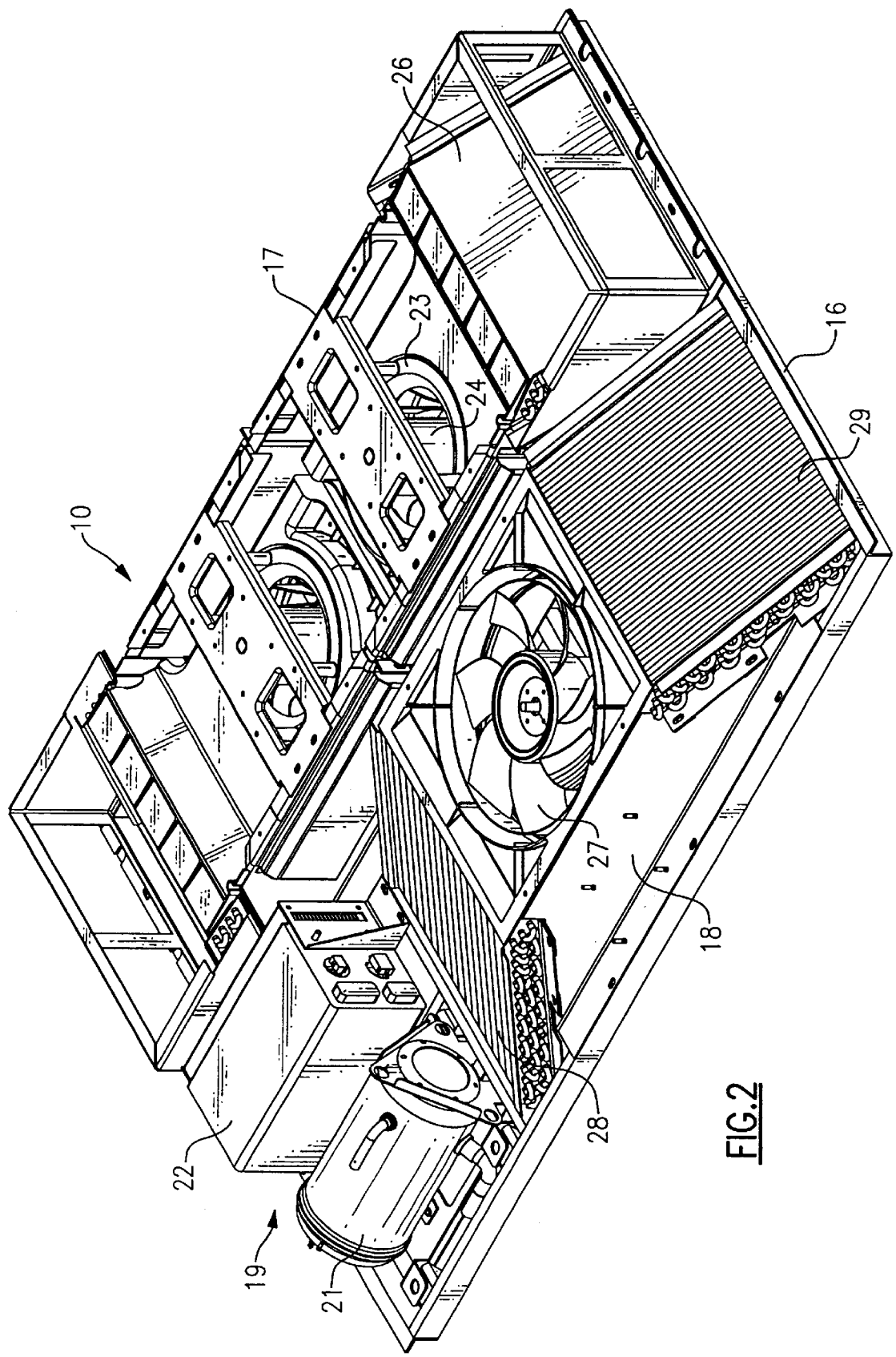
FIG. 2 is a perspective view of a module with the top cover removed.

In FIG. 2, the module 10 is shown with its cover removed to include a frame 16 with an evaporator section 17 attached to one end thereof and a condenser section 18 attached to the other end thereof. Adjacent the condenser section 18 is a power section 19 which includes a compressor 21 and an inverter/controller 22. The manner in which they provided motive power to the refrigerant circuit and electrical power to the electrical components of the module 10 will be more fully described hereinafter.

The evaporator section 17 comprises a pair of identical units in abutting end-to-end relationship with each unit including an evaporator blower 23 with is evaporator blower motor 24, and an evaporator coil 26. Briefly, the evaporator blower 23 draws in return air from the passenger compartment of the bus, and fresh air from outside and passes a mixture of the two through the evaporator coil 26 to be conditioned, after which it flows back to the passenger compartment by way of the supply air ducts. This will be more fully described hereinafter.

Within the condenser section 18, there is provided a condenser fan 27 driven by an electric motor, and a pair of condenser coils 28 and 29. Briefly, the condenser fan draws air upwardly to create a vacuum below, which in turn causes fresh air to be drawn through the condenser coils 28 and 29 to condense the refrigerant flowing through the coils 28 and 29. The resulting warm air is then discharged upwardly to the atmosphere by the fan 27.

Figure 3:
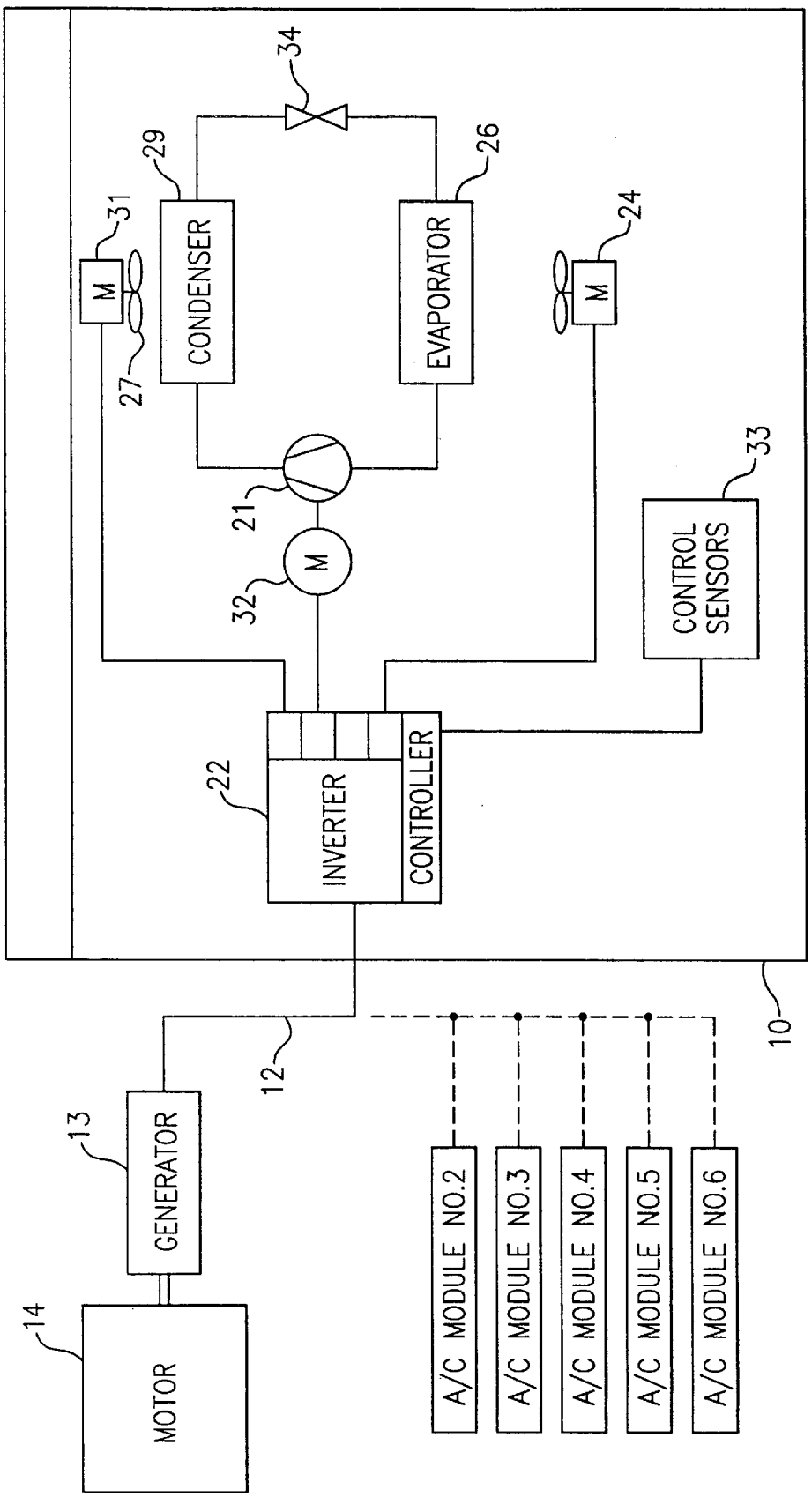
FIG. 3 is a schematic illustration of the electrical and refrigerant circuits within the module in accordance with the preferred embodiment of the invention.

Referring now to FIG. 3, the module 10 is shown with its electrical connection by way of line 12 to the generator 13 and driving motor 14. The inverter/controller 22 receives AC power from the generator, or alternator, and, in turn provides discretely controlled AC power to the evaporator blower motor 24, the drive motor 31 of the condenser fan 27 and the drive motor 32 of the compressor 21. A plurality of control sensors, shown generally at 33 provide feedback to the inverter/controller 22 as necessary for it to control the AC power being delivered to the various drive motors.

As will be seen, the refrigeration circuit is a closed circuit through which the refrigerant flows from the compressor 21 to the condenser 29, an expansion valve 34, the evaporator 26 and finally back to the compressor 21. This is accomplished in a conventional manner.

It will be seen that the module 10 is self-contained with all of the necessary components, with the only input thereto being the electrical power by way of the electrical line 12. Other modules, indicated as numbers 2–6 are identically configured and are powered and controlled in the same manner.

Returning now to the condenser section 18 as shown in FIG. 4, the flow of air as caused by the condenser fan 27 is shown by the arrows. Fresh air is drawn in through the fresh air intake openings 36 and 37, passes through the respective condenser coils 28 and 29 and then flow upwardly through the condenser fan 27 and the condenser outlet air opening 38 as shown.

Within the evaporator section 17 as shown in FIG. 5, the relatively warm return air flows upwardly from a return air opening (not shown) communicating with the passenger compartment and enters a return air plenum 39 of the evaporator section 17 as shown by the arrows. The evaporator blower 23 causes the return air to flow upwardly to its inlet at the top, and at the same time, fresh air may be brought in by way of a fresh air flap in a manner to be described hereinafter. A mixture of the two airflow streams is thus admitted at the intake of the evaporator blower 23 and caused to flow downwardly and outwardly as indicated by the arrows to the evaporator coils 26. After passing through the evaporator coil 26 it is then caused by a curved cowling 41 to flow downwardly to a supply air duct leading to the passenger compartment. Thus, while the module is operating, there is a constant circuitous flow of return air out of the passenger compartment and of conditioned air back into the passenger compartment. The amount of return air that is discharged to the outside, and also the amount of fresh air that is brought into the circuit from the outside is controlled by the selective movement of the fresh air flaps as will be described hereinafter.

Figure 6:
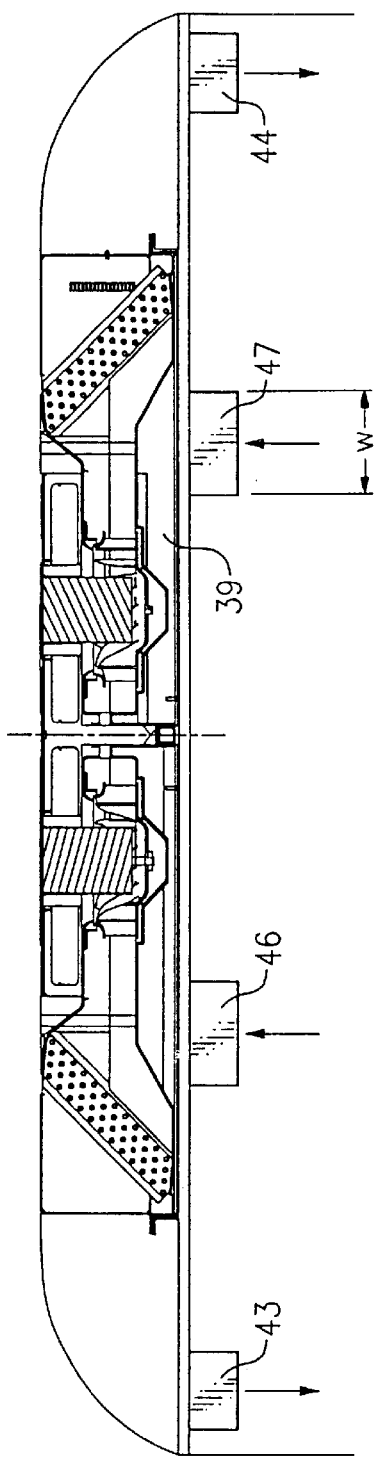
FIGS. 6–8 are front elevational views of the evaporator section as applied to different types of bus rooftops.
Figure 7:
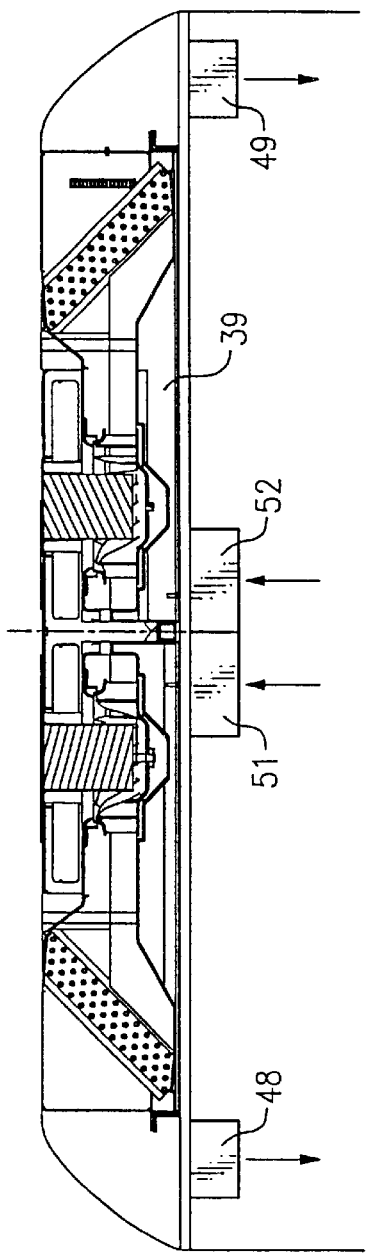
Figure 8:
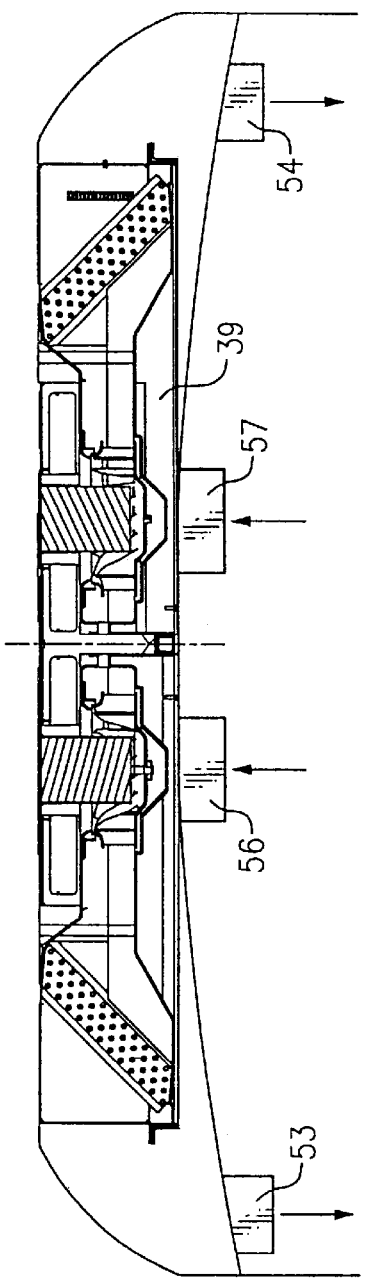

There are shown in FIGS. 6–8, installations of the module 10 with various types of buses and associated return air and supply air openings. In FIG. 6, for example, a wide bus installation is shown wherein the existing ductwork within the bus includes supply air ducts 43 and 44 near the lateral sides of the bus, and return air openings 46 and 47 that are closer to the centerline of the bus, but are substantially spaced apart. Here it will be seen that the return air openings 46 and 47 communicate directly with the return air plenum 39 of the module 10, but at a position at near the outer end thereof.

In FIG. 7, which shows a narrow bus installation, again the supply air ducts 48 and 49 are near the transverse sides of the bus. But the return air openings 51 and 52 are abutting each other at the centerline of the bus. Again, the return air openings 51 and 52 fluidly communicate with the return air plenum 39, but at the other end thereof.

Finally, in FIG. 8 there is shown a curved top bus wherein the supply air ducts 53 and 54 are again near the transverse sides of the bus, but the return air openings 56 and 57 are in intermediate positions, relatively close to the centerline but substantially spaced apart. Again, the return air openings 56 and 57 fluidly communicate with the return air plenum 39, but at a position intermediate the two ends thereof.

It will thus be seen that the same identical module is so constructed and designed that it can accommodate any of these various installation requirements without modification of the module itself. That is, the conditioned air discharge opening 40 is sufficiently large and the transverse direction to accommodate the various supply air duct orientations, and, more importantly, the return air plenum 39 is relatively large in the transverse direction so as to accommodate each of the various types of return air opening configuration as shown.

Figure 9:
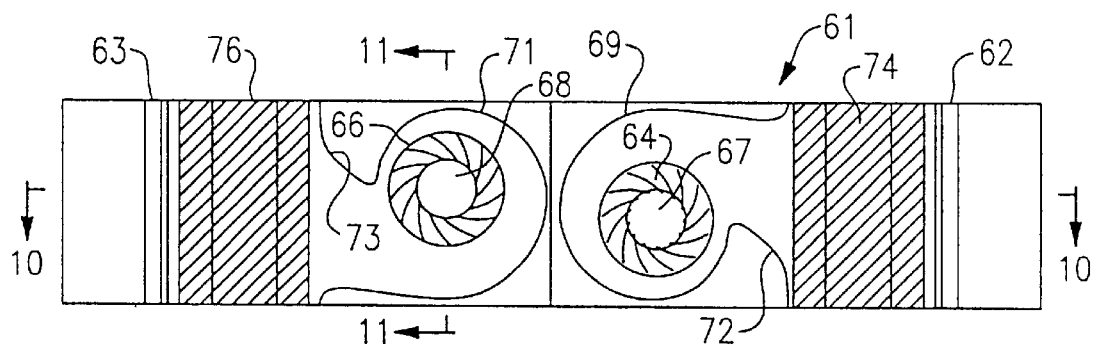
FIG. 9 is a top view of an alternate evaporator section.
Figure 10:
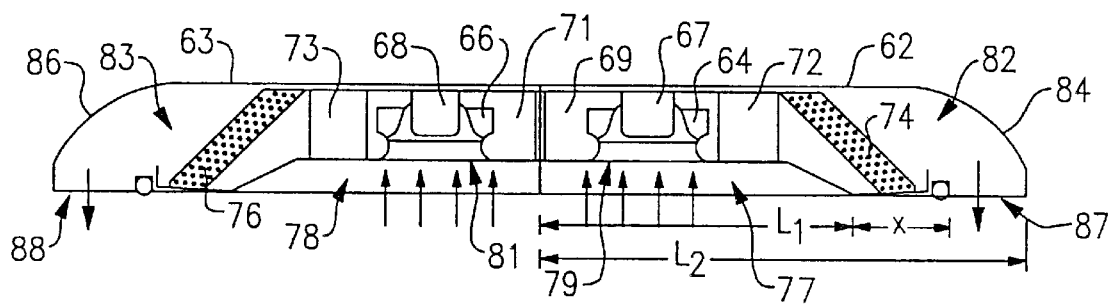
FIG. 10 is a sectional view thereof as seen along lines 10—10 of FIG. 9.
Figure 11:
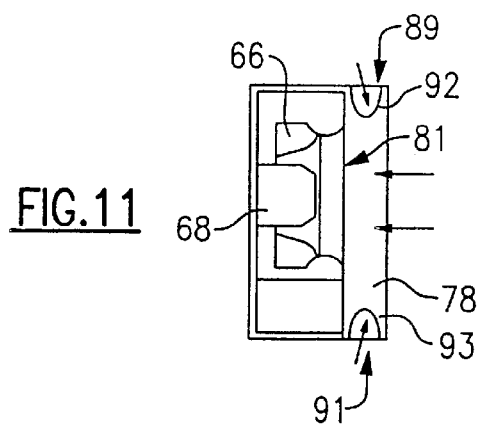
FIG. 11 is a sectional view thereof as seen along lines 11—11 of FIG. 9.

Referring now to FIGS. 9–11, an alternate evaporator section is shown at 61 to include a pair of identical units 62 and 63 in back-to-back relationship with respect to the centerline of the bus. Centrifugal fans 64 and 66 driven by respective motors 67 and 68 are located near the centerline of the bus, and with their axis oriented vertically.

As will be seen, the fans 64 and 66 are surrounded by respective scrolls 69 and 71 having relatively short diffusers 72 and 73 leading to the evaporator coils 74 and 76, respectively.

As will be seen in FIG. 10, the fans 64 and 66 are raised so as to provide for the return air plenums 77 and 78, respectively, therebelow. It should be noted that the longitudinal length $L_1$ (i.e., the distance the plenum 39 extends laterally across the half-width of the bus) of the plenum 39 is substantial as compared with the width of the return air duct (see FIGS. 6–8) and also as compared with the total lateral length of the unit $L_2$. The present design has a dimension of $L_1$ =595 mm. The dimension $L_2$ will vary depending on the particular installation. In this regard, the dimension x represents the lateral length of the unit structure between the return air plenum and the supply air discharge opening. This dimension will vary from a minimum of 130 mm to a maximum of 230 mm. The lateral dimension of the supply air discharge opening will also vary from a minimum of 60 mm to a maximum of about 120 mm. Accordingly, the lateral length $L_2$ will vary from 785 mm to 945 mm. The ration of $L_1/L_2$ will therefore be in the range of 0.629 to 0.758 mm. The feature of this relatively large ratio is important in allowing the use of the identical units for various rooftop installation requirements as discussed hereinabove.

In comparing the lateral length of the return air plenum with the lateral width of the return air opening it will be seen that the lateral length L, is substantially greater than the width w. Typically the width w of the return air opening is around 120–450 mm. Considering then the ration of the two, the length of 595 mm is on the order of 1.322 to 1.983 times that of the width w of the return air opening.

Finally, comparing the length $L_1$ to the half-width of a bus, a typical bus is about 2150 mm wide, such that the ration of the unit length $L_1$ to a half-width of a typical bus is about 0.553. Thus, it can be said that the length $L_1$ is about half of the half width of a bus.

With the two level approach, i.e., with the return air plenums 77 and 78 being at one level, and with the fans 64 and 66 being at a higher level, the return air is drawn into the return air plenums 77 and 78 and then enters the fans 64 and 66 by way of inlets 79 and 81, respectively. The air then remains at the second level and is blown radially outwardly toward the coils 74 and 76, respectively.

The centrifugal fans 64 and 66 are relatively shallow in the vertical direction but relatively large in diameter. The drive motors 67 and 68 are shown in positions above the fans but may be positioned below the fans. The fan rotors may have backward curved, radial or forward curved blades. Located outboard the evaporator coils 74 and 76, are the pressure plenums 82 and 83 as partially defined by curved cowlings 84 and 86, respectively. Downstream of the pressure plenums 82 and 83 are the supply air discharge openings 87 and 88, respectively.

Referring now to FIG. 11, the return air is shown by the arrows at the right. On each side of the fan, a fresh air opening with an associated flap is provided to introduce fresh ambient air into the return air plenum 78 to be mixed with the return air prior to its entering into the fan 66. The fresh air openings are shown by numerals 89 and 91, whereas the flaps are indicated at 92 and 93, respectively. It will be recognized that the openings 89 and 91 are relatively small compared with the return air opening into the plenum 78. Accordingly, this design is intended to allow for a fractional quantity of fresh air to be drawn in and mixed with the return air passing through the fan. There is thus a blockage of a small quantity of return air flow when the flaps 92 and 93 are open, but even when fully opened, the flaps 92 and 93 do not provide for a large blockage of return air flow.

In operation, the return air flows into the plenum 78 with a fraction of fresh air being introduced into the openings 89 and 91 as desired. The mixture of air then passes through the fan 66 and is caused to flow outwardly through the scrolls 69 and 71 and the diffusers 72 and 73, respectively. After passing through the evaporator coils 74 and 76, the conditioned air flows into the pressure plenums 82 and 83, respectively and then through the supply air discharge openings 87 and 88 to be discharged to the passenger compartment.

Unlike a draw-through fan system of the prior art, wherein the cooled air comes off the fans as a high velocity jet flow blasting into the bus supply air ducts, the present design provides for low velocity, but high pressure flow in the pressure plenums 82 and 83. The openings, 87 and 88 can be, and preferably are, larger than the conventional openings for a draw-through fan in order to take advantage of the low velocity flow and lower losses. This may preferably take the form of rather narrow but relatively long slots through which the air is discharged.

Figure 12:
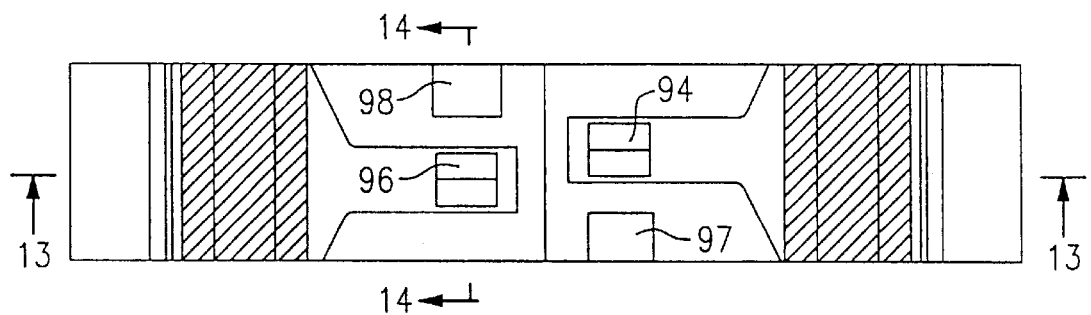
FIG. 12 is a top view of yet another embodiment of an evaporator section.
Figure 13:
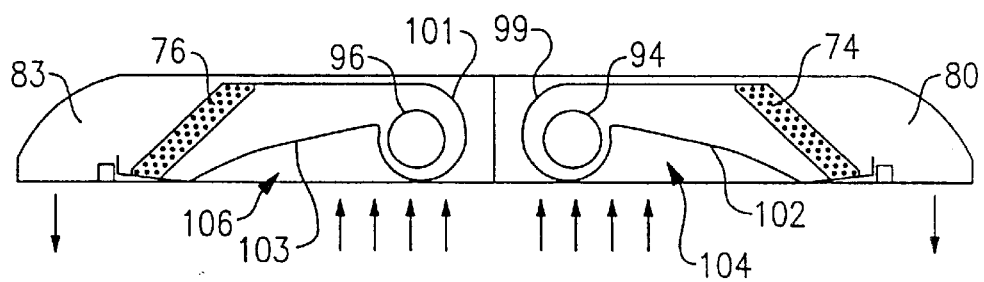
FIG. 13 is a sectional view thereof as seen along lines 13—13 of FIG. 12.
Figure 14:
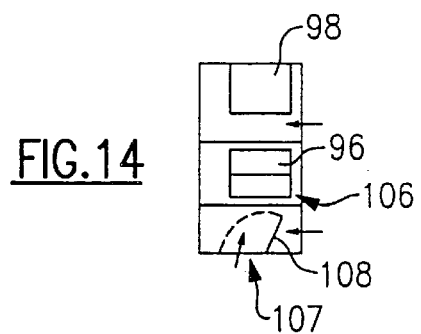
FIG. 14 is a sectional view as seen along lines 14—14 of FIG. 12.

Referring now to FIGS. 12–14, an alterative embodiment of the evaporator section is shown to include a similar blow through arrangement, but with the fans having their axes disposed in the horizontal plane as shown. The respective scrolls are shown at 99 and 101, and the diffusers at 102 and 103. The placement of the evaporator coils 74 and 76 are identical as in the previous embodiment, and the structure and function of the pressure plenums 82 and 83 are identical as previously described.

Because of the height limitations of the evaporator units, the diameter of the fans 94 and 96 are necessarily smaller than those for the fans with a vertical axes orientation. Thus, a forward curved blower wheel is desirable, and, as will be seen, they are of the double inlet type wherein air can enter from both ends of the fan. The diffusers 102 and 103 are relatively long as compared with their described diffusers for use with the vertical axes fans.

Again, return air plenums 104 and 106 are provided at a lower level of the units, and the fans 94 and 96 are provided at a second level for receiving the air and then blowing it outwardly to the coils 74 and 76. Like the earlier described design, the return air plenums 104 and 106 are longitudinally extensive and have substantially the same relative dimensions as described hereinabove with respect to the vertical axes fans.

Referring now to FIG. 14, the flow of return air is shown by the arrows at the right as flowing in to enter each end of the fan 96 as driven by the motor 98. In order to facilitate the introduction of fresh air to be mixed with the flow of return air, a fresh air opening 107 and associated flap 108 is provided in the one side as shown. The position of the flap 108 is selectively adjustable so as to bring fresh air into the system as desired. In a manner similar as described hereinabove, as the flap 108 is moved toward the fully opened position, it both uncovers the fresh air opening 107 and increasingly tends to decrease the flow of return air coming into the system. However, even when it is in the fully opened position, there is a relatively small percentage of the return air flow that is blocked.

In operation, the return air and fresh air come into the lower return air plenum 106, after which a mixture of the two flows upwardly into the two inlet openings on either side of the fan 96. The fan 96 then blows the air out from the scroll 101 and the diffuser 103 to the evaporator coil 76 where it is cooled, after which the air enters the pressure plenum 83 and is discharged, at a relatively high pressure and low velocity, to the supply air duct which carries it to the passenger compartment.

While the present invention has been particularly shown and described with reference to the preferred mode as illustrated in the drawings, it will be understood by one skilled in the art that various changes in detail may be effected therein without departing from the sprit and scope of the invention as defined by the claims.

I claim:

1. A bus air conditioning system with at least one air conditioning module installed on a bus roof having at least one supply air opening for conducting the flow of conditioned air downwardly near the outer side of the roof and a return air opening whose position may vary substantially in the lateral direction from a longitudinal central axis of the bus for any given installation, comprising:

a refrigeration circuit for circulating refrigerant serially through a compressor, a condenser coil, an expansion valve and an evaporator coil;

an evaporator section including an evaporator blower for causing return air to flow from said return air opening, into a return air plenum of said evaporator section, through said evaporator coil and then to said supply air opening; and a condenser fan for causing outside air to flow over said condenser coil and then to be discharged outside;

wherein said evaporator return air plenum extends over a substantially greater lateral width than said return air opening such that when said module is in its installed position on the roof, said evaporator return air plenum is disposed directly above and fluidly communicates with the return air opening of the bus even though the lateral position of said return air opening may vary from one installation to another; and further wherein said rooftop return air opening is located near a longitudinal center line of the bus.

2. A bus air conditioner as set forth in claim 1 wherein said rooftop supply air opening is located near the side edges of the bus.

3. A bus air conditioning system as set forth in claim 1 wherein said bus may be of either a wide or narrow body type wherein said return air opening is disposed at a substantial distance from or adjacent to said longitudinal centerline, respectively.

4. A bus air conditioning system as set forth in claim 1 wherein said evaporator blower is located upstream of said evaporator coil.

5. A bus air conditioning system as set forth in claim 1 wherein said bus may be of the curved roof type.

6. An air conditioning system as set forth in claim 1 wherein said return air plenum extends over at least 30% of the length of said module.

7. An air conditioning system as set forth in claim 1 wherein said return air plenum extends over at least 50% of the half width of the bus roof.

8. An air conditioning system as set forth in claim 1 wherein the lateral length of said return air plenum is greater than 1.3 times a lateral width of said return air opening.

9. A method of providing an air conditioning module for use on the roofs of a variety of bus types having different lateral placements of supply and return air openings, respectively, comprising the steps of:

providing a condenser section with a condenser coil and a fan for circulating ambient air through said coil;

providing an evaporator section with an evaporator coil and a fan for circulating air from an internal compartment of a bus, through said return air opening, said evaporator coil and said supply air opening to reenter said internal compartment; and providing a return air-plenum within said evaporator section for extending directly above said return air opening and for fluidly communicating between said return air opening and said evaporator coil, said return air plenum having a lateral length substantially greater than of said return air opening such that it can accommodate various lateral positions of said return air opening; and further wherein said return air opening is positioned near a longitudinal centerline of said bus and said supply air opening is positioned near a lateral side of said bus.

10. A method as set forth in claim 9 wherein bus types include both wide body and narrow body buses.

11. A method as set forth in claim 9 wherein said bus types include buses having curved rooftops.

12. A method as set forth in claim 9 wherein bus types include both those with a return air opening that is relatively near to said longitudinal centerline of said bus and those that are relatively far from said longitudinal centerline of said bus.

13. A method as set forth in claim 9 and including the step of installing said module on one lateral side of a longitudinal centerline of said bus.

14. A method as set forth in claim 9 wherein said return air plenum is so constructed as to extend over at least 30% of the length of said module.

15. A method as set forth in claim 9 wherein said return air plenum is so constructed as to extend over at least 50% of the half width of the bus roof.

16. A method as set forth in claim 9 wherein said return air plenum is so constructed as to have a lateral length that is at least 1.3 times a lateral width of said return air opening.

* * * * *